United States Patent [19]

Tanaka et al.

[11] 4,327,378
[45] Apr. 27, 1982

[54] AUTOMATIC IRIS CONTROL FOR SOLID-STAGE IMAGING APPARATUS

[75] Inventors: Takanori Tanaka; Masanobu Morishita, both of Tokyo, Japan

[73] Assignee: Nippon Electric Co., Ltd., Tokyo, Japan

[21] Appl. No.: 156,163

[22] Filed: Jun. 3, 1980

[30] Foreign Application Priority Data

Jun. 8, 1979 [JP] Japan .................................. 54-72021

[51] Int. Cl.³ ............................................. H04N 5/26
[52] U.S. Cl. .................................... 358/228; 358/213
[58] Field of Search ............... 358/212, 213, 227, 228; 350/266, 269, 270–275; 354/22, 26, 30, 29, 36, 38, 43

[56] References Cited

U.S. PATENT DOCUMENTS 3,576,393  4/1971  Thompson ........................ 358/228
3,586,773  6/1971  Niemyer ............................ 358/228

FOREIGN PATENT DOCUMENTS 2734681   2/1979  Fed. Rep. of Germany ...... 358/228
54-126425 10/1979  Japan ................................. 358/228

OTHER PUBLICATIONS

Automatic Light Control Electro-Optical CCDTV Systems; Sandhu, et al; Jan. 1978, IEEE Trans on Aerospace and Electronic Systems, vol. Aes-14 #1.

Primary Examiner—Michael A. Masinick
Attorney, Agent, or Firm—Laff, Whitesel, Conte & Saret

[57] ABSTRACT

An iris controls the amount of light transmitted through television camera lens to an integrated semiconductor matrix of light responsive elements. A characteristic of the matrix is that photo-charges may overflow the light responsive elements if the light falling on the matrix becomes too bright. The normal iris control responds to a loss of picture contrast caused by the overflow of charges and attempts to increase contrast by increasing the amount of light passing through the lens. The invention compares the output from the light responsive elements with a reference signal representing black areas in the picture. When the comparison exceeds a given difference, a special iris control overrides the normal iris control in order to reduce the amount of light passing through the lens. The reference signal may be taken from one or more of the light responsive elements which are shielded from light passing through the lens. Or, the reference signal may be taken during periods between picture frames when the video signal does not record any light.

13 Claims, 13 Drawing Figures

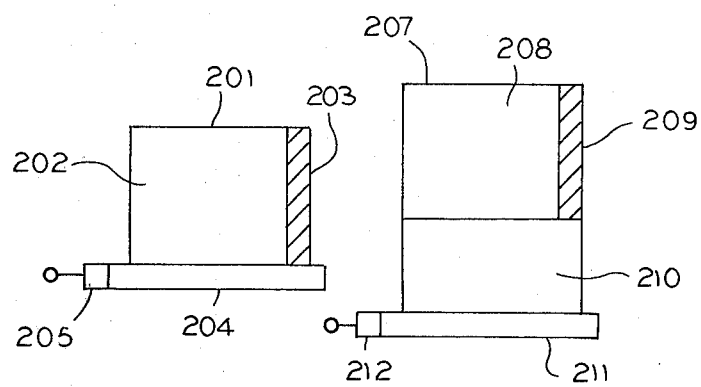
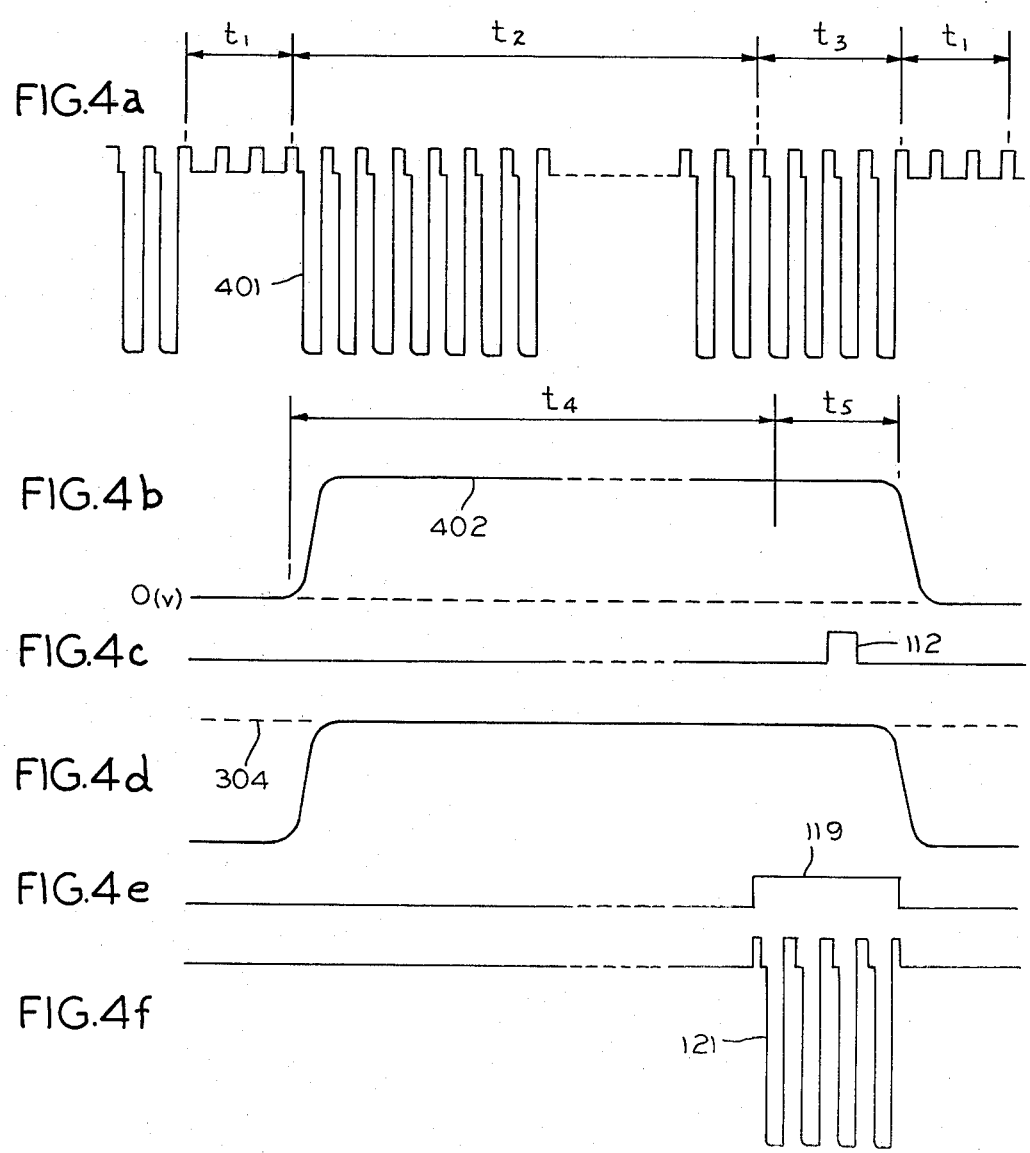

AUTOMATIC IRIS CONTROL FOR SOLID-STAGE IMAGING APPARATUS

BACKGROUND OF THE INVENTION

1. Field of the Invention

The present invention relates to an automatic iris control mechanism for a solid-state imaging apparatus using a charge-coupled imaging device (hereinafter referred to as "CCD imaging device").

2. Description of the Prior Art

Automatic iris control mechanisms for solid-state imaging apparatus, have conventionally controlled the intensity of light transmitted through the iris to the imaging device. This intensity is controlled at a proper level in accordance with the level of a video signal obtained as a result of the imaging operation.

A solid-state imaging apparatus using the CCD imaging device can also employ the same automatic iris control mechanism, by which the intensity of light passing through the iris and falling upon the CCD imaging device is controlled in accordance with the video signal level. The CCD imaging device, employed in the solid-state imaging apparatus, generally eliminates the influence from the fluctuations in a dark current due to temperature change. To do this, the additional imaging area is formed with an area, which is shielded from an incident light in order to supply an electrical signal corresponding to an optical black. The output signal corresponding to the optical black is also used as the reference signal for the imaging signal, from which the video signal level is detected to control the intensity of incident light. In CCD imaging devices, having none of the afore-mentioned additional imaging area, the horizontal transfer register is subjected to the idle transfer, after the charges in one horizontal line are transferred. The output signal resulting from that idle transfer is used as the reference signal of the imaging signal.

As is well known in the art, the CCD imaging device is divided into two types, i.e., the interline transfer type and the frame transfer type. The interline transfer type device is composed of many light sensors, vertical transfer registers and a horizontal transfer register. The frame transfer type device is composed of an imaging area, a storage area and a horizontal transfer register. Generally speaking, when an intense light enters the light sensors or the imaging area the charge generated by that incident light may exceed the upper level that can be accumulated in the potential wells of the light sensors or the imaging area. The charge will then overflow from the potential wells and pour into the neighboring potential well to deteriorate the reproduced image. Moreover, if the charge is extremely excessive, the overflow charges reach the horizontal transfer area and fill up the potential wells thereof. Under this particular condition, neither a video signal nor a reference signal can be obtained. All of the output levels become equal so that the video signal level can no longer be detected by the afore-mentioned method for detecting the video signal level. The result of such a situation is equivalent to that in which no light comes from an object. In both situations, the maloperation of the automatic iris control mechanism operates the iris in the direction which increases the light intensity incident upon the CCD imaging device, despite an already intense light.

SUMMARY OF THE INVENTION

It is, therefore, a principal object of the present invention to eliminate the afore-mentioned disadvantage and to provide an automatic iris control mechanism for a solid-state imaging apparatus which can successfully control an intensity of light incident upon a solid-state imaging device, without any erroneous operation, even in the presence of an intense incident light.

According to the major feature of the present invention, a solid-state imaging apparatus uses a charge-coupled imaging device which comprises an imaging device including an imaging area and an output means for producing an electrical output signal from charges generated in the imaging area. Also, a video information signal and a reference signal are produced from the electrical output signal. An optical iris, which controls the intensity of the light incident upon at least a part of the imaging area, is also provided along with a first iris control means for controlling the optical iris responsive to the video information signal and the reference signal. An overflow of charges from the imaging area, detected and is used with a second iris control means for controlling the optical iris to lower the intensity of the light. Thus, when the overflow of charges from the imaging area is not detected, the optical iris is controlled by the first iris control means to maintain the intensity of the light to a proper value. When the overflow of charges from the imaging area is detected, the optical iris is controlled by the second iris control means to stop the overflow of charges by lowering the intensity of the light.

BRIEF DESCRIPTION OF THE DRAWINGS

The above and further objects, features and advantages of the present invention will become more apparent from the following detailed description taken in conjunction with the accompanying drawings, wherein:

FIG. 2a is a schematic showing a CCD imaging device of the interline transfer type whereas FIG. 2(b) shows the CCD imaging device of the frame transfer type; and FIGS. 3(a) to 3(d) and 4(a) to 4(f) are waveform charts illustrating the operations of one embodiment of the present invention.

DESCRIPTION OF THE PREFERRED EMBODIMENT

Figure 1:
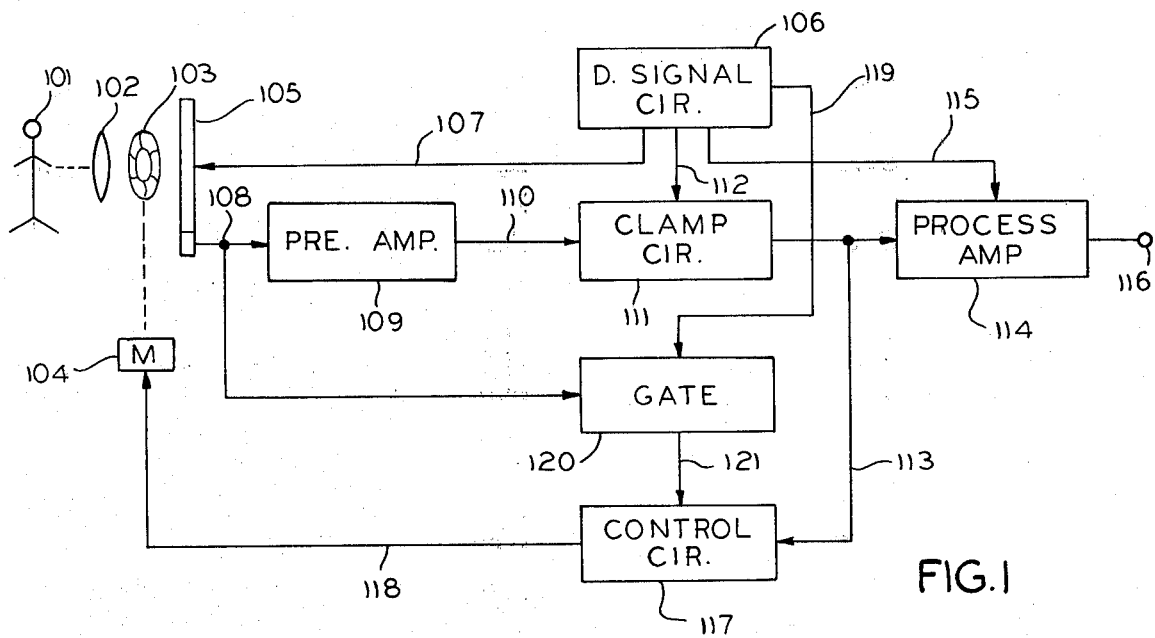
FIG. 1 is a schematic view for illustrating one embodiment of the present invention.

According to one embodiment of the present invention, as shown in FIG. 1, the image of an object 101 is focused through a lens 102 and an optical iris 103 upon a CCD imaging device 105. The CCD imaging device 105 may be of the interline transfer type or of the frame transfer type. It is driven by drive signals 107 from a drive signal generator 106 and feeds its output signal 108 to a pre-amplifier 109. The output signal 108 is amplified in pre-amplifier 109 and fed through an output 110 to a clamp circuit 111. In response to the clamp pulses 112 from the drive signal generator 106, the clamp circuit 111 generates the video signal 113 which is prepared by clamping the image signal component of the output 110 at the reference votlage of a black level. The reference signal, at the black level, is prepared by the output which is generated from an optically shielded portion of the CCD imaging device 105, as will be described with reference to FIG. 2. The video signal 113 is subjected to the gamma compensating, white and black clipping treatments by a process amplifier 114 and is supplied with a blanking signal and a synchronous signal 115 from the drive signal generator 106. The output at terminal 116 is the composite video signal.

The video signal 113 is also fed to a control circuit 117. This control circuit 117 generates a control signal 118 in accordance with the voltage level of the video signal 113. A meter or motor 104 is driven by the output of the control circuit 117, to control the opening of the iris 103 and maintain a proper level of the intensity of the light incident upon the imaging device 105.

According to the embodiment being described, counter-measures are taken for correcting an otherwise malfunction in the automatic iris control mechanism when a more intense light creates a blooming phenomena on the imaging device 105. More specifically, the output signal 108 from the CCD imaging device 105 is fed to a gate 120. The output from an optically shielded imaging sensor portion of the CCD imaging element 105 is taken out separately from the output terminal at 108, in response to the gate signal on conductor 119, from the drive signal generator 106. The output 121 from the gate 120 is the control signal for the control circuit 117, but only when the output obtained from the optically shielded imaging sensor portion of the CCD imaging device 105 is higher than a predetermined level. The high level of the output is caused by the charge overflow as a result of the blooming phenomenon on the remaining imaging sensor portion of the CCD imaging device 105. This blooming can be easily detected by a comparison of the signal level from device 105 with a preset voltage. In response to the output 121, the control circuit 117 operates to close the iris 103. When the quantity of the light radiated through the iris 103 is reduced sufficiently to eliminate the blooming phenomenon, the output 121 disappears and the subsequent control of the iris 103 is no longer performed in accordance with the output 121, but is performed in accordance with the signal level of the video signal 113.

The CCD imaging device 105 used in the solid-state imaging apparatus thus far described is divided into two types, i.e., the interline transfer device and the frame transfer device, as shown in FIGS. 2(a) and (b), respectively. The CCD imaging device 201, of the interline transfer type, as shown in FIG. 2(a), is constructed to have its light receiving area 202 formed with a number of arrays of photoelectric converting elements, which are arranged in a plurality of columns extending in a vertical direction, to a horizontal transfer register 204. Vertical transfer registers of CCD elements are positioned between the columns of the photo-charge converting elements. At the righthand end of the light receiving area 202, there is a shielded imaging sensor area 203 which is composed of a plurality of photo-charge converting elements shielded from the incident light. The shielded area 203 produces an electrical signal corresponding to the optical black. After the photo-charge conversion, the charges accumulated in the photo-charge converting elements of the light receiving area 202 are transferred to the adjoining vertical transfer registers from which they are further transferred toward the horizontal transfer register 204. The charges are further transferred through the horizontal transfer register 204 toward an output area 205 and there they generate an electrical output signal. The position of the shielded imaging sensor area 203 is not limited to that area shown in the example of FIG. 2(a). The left-hand side area and the upper side area opposite to the horizontal transfer register 204 may also serve as a position for the shielded imaging sensor area 203.

The CCD imaging device 207 of the frame transfer type shown in FIG. 2(b), is composed of a light receiving area 208 and a storage area 210. A number of photocharge converting elements are two dimensionally arranged in a matrix of rows and columns. A shielded imaging sensor area 209 contains a number of photocharge converting elements which are one-dimensionally arranged. The area 209 is shielded so that no light is received and that produces an electrical signal corresponding to the optical black. The imaging device 207 also has a horizontal transfer register 211 of CCD elements and an output area 212. The charges generated at the light receiving area 208 are transferred to a storage area 210, and from the area 210 they are further transferred to a horizontal transfer area 211 during a subsequent imaging period. An output signal is generated in an output area 212 from charges transferred through area 211. In this type of CCD imaging device, the left-hand side area and the upper side area opposite to the horizontal transfer register 211 may also serve as the position of the shieded imaging sensor area 209.

The CCD imaging device of either the interline transfer type or the frame transfer type can be used with the present invention. Desirably, they are formed with the shielded imaging sensor area disposed adjacent to the light receiving area.

The operations of the present embodiment is next described in detail.

Figure 3A:
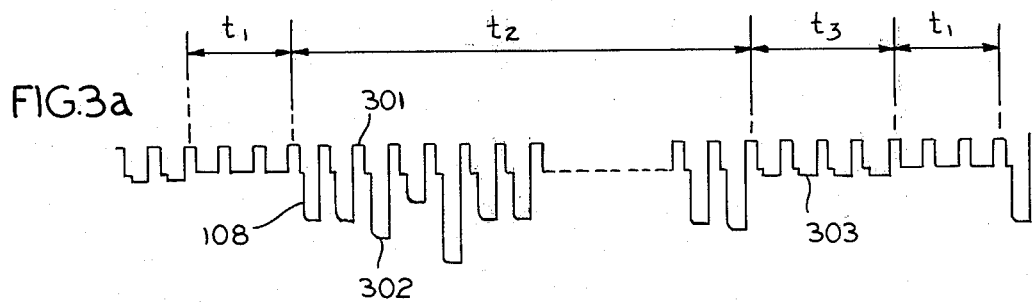
Figure 3B:
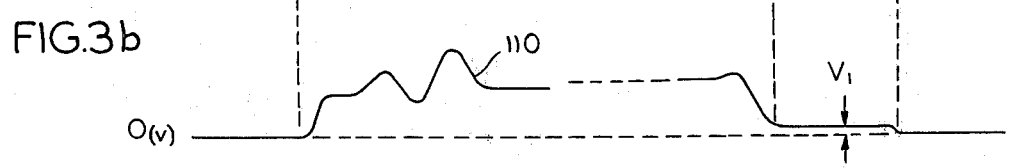
Figure 3C:
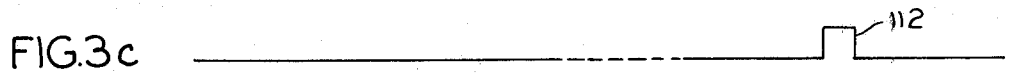

The image of the object 101 is focused upon the CCD imaging device 105 by the lens 102. The CCD imaging device 105 is driven by the drive signal 107 coming from the drive signal generator 106. FIG. 3(a) is a waveform chart showing the output signal 108 coming from the CCD imaging device 105. Letters $t_1$, $t_2$ and $t_3$ indicate the horizontal blanking period, the effective imaging period, and the period for obtaining outputs from the light shielded imaging sensor areas 203 and 209 (FIG. 2) for supplying the optical black signal level. The output signal 108 contains only a reset noise 301 in the period $t_1$, a signal 302 in the period $t_2$ and an output signal 303, which is due to a dark current for the period $t_3$.

Line (b) of FIG. 3 shows the video signal 110, which is prepared by amplifying the output signal 108 (FIG. 1) in the pre-amplifier 109 and by feeding that amplified signal through a low-pass filter. The period $t_4$ of line (b) corresponds to the period $t_2$ of FIG. 3(a), and the period $t_5$ of line (b) corresponds to the period $t_3$ of line (a). During the period $t_5$, an output $V_1$ is generated which comes from the light shielded area 203 or 209 (FIG. 2) and which supplies the optical black signal level. The output $V_1$ for this period is due to the dark current of the CCD imaging device and is used as the reference signal of the video signal.

Line (c) of FIG. 3 shows the waveform of the clamp pulse 112.

Figure 3D:
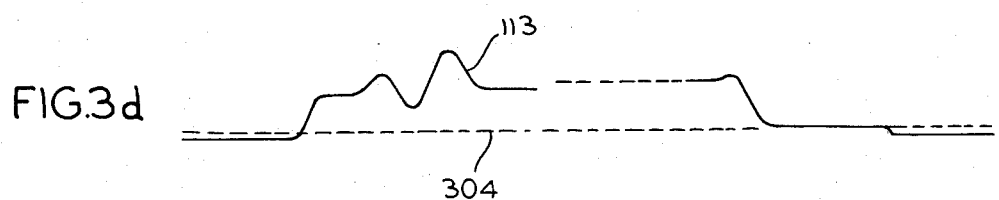

As shown in FIG. 3(d), the video signal 113 is generated by fixing the signal $V_1$, for the period $t_5$, with the use of the clamp circuit 111 (FIG. 1) at a black level 304. The video signal 113 is subjected to the gamma compensating, white and black clipping treatments by the process amplifier 114 and then is supplied with the blanking signal or synchronous signal 115. The composite video signal is generated at the output terminal 116. The control circuit 117 receives the video signal 113 and (depending upon the amplitude of that video signal 113) feeds the control signal 118 to the meter or motor 104. The iris 103 is operated by the meter or motor 104 to maintain the intensity of the light incident upon the imaging device 105 at a proper level.

Next, FIG. 4 illustrates the operation if the CCD imaging device 105 (FIG. 1) is exposed to an intense light to thereby invite the blooming phenomenon. As is well known in the art, when the CCD imaging device 105 is exposed to the intense light, the resultant signal charges which accumulate in the imaging elements are so numerous that they overflow the imaging elements of the light receiving area 202 or 208 and into the horizontal transfer register 204 or 211.

When the charge generated by the incident light becomes several hundred times of the upper limit that can be transferred by the horizontal transfer register 204 or 211, the overflown charge fills up the whole horizontal transfer register 204 or 211.

FIG. 4(a) illustrates the output signal waveforms of the CCD imaging device 105 under that particular overflow condition. As shown, the overflowing charge may even overflow into the shielded imaging sensor area 203 or 209, which is to the area supplying the optical black signal level, for the period $t_3$. This generates an output signal 401 having a high amplitude resulting in outputs $t_2$ and $t_3$ having a uniform high amplitude for the time period other than the horizontal blanking period $t_1$. FIG. 4(b) shows the video signal 402, which is generated by amplifying output 401 (FIG. 4(a)) in pre-amplifier 109 (FIG. 1) and by feeding the amplified output 401 through a low-pass filter. As shown, the signal for the period $t_5$, which corresponds to the optical black signal from the covered area 203 or 209, is at the same level as that of the signal for the effective video period $t_4$. As a result, if the signal 402 is clamped by the clamp circuit 111 (FIG. 1), the signal for the effective video period is fixed at the black level 304, as shown in FIG. 4(d). This clamping level is identical to the condition where there is no video signal or no light is received. The iris control which responds to that video signal causes an erroneous operation. As has been noted before, the output corresponding to the overflow charge is fed out of the horizontal transfer register as an output, corresponding to the optical black. Thus, this output corresponding to the overflow charge, is extracted from the gate circuit 120 (FIG. 1) which is used to prepare control signal 118.

FIG. 4(e) illustrates the gate signal 119 which is fed from the drive signal generator 106 (FIG. 1) to the gate circuit 120. As shown, the gate signal 119 has substantially the same width as the period $t_3$ corresponding to the period for supplying the optical black. As shown in FIG. 4(f), the gate circuit 120 takes a signal out of the portion which corresponds to the output signal from the shielded imaging sensor area 203 or 209. As a result, the gate circuit 120 can generate an output 121 which corresponds to the overflow charge from the CCD imaging device 105. Therefore, that output 121 is used to generate the control signal 118 which closes the iris 103, until the charge becomes free from the overflow.

When the charge stops its overflow, the gate circuit 120 (FIG. 1) generates only the output corresponding to the dark current component which is detected from the shielded imaging sensor area 203 or 209 (FIG. 2) of the CCD imaging device 105. Under this condition, in which only the output corresponding to the dark current component is generated, the output 113 of the clamp circuit 111 has become the normal video signal. Thereafter, the iris 103 is controlled by that video signal 103.

As has been described hereinbefore, in those situations where the quantity of the incident light upon the CCD imaging device 105 assumes a proper level, the iris is controlled in accordance with the video signal. In those situations where the incident light becomes so excessive that the CCD imaging device experiences its blooming phenomenon, the iris 103 is controlled in accordance with the output signal from the aforementioned shielded imaging sensor area.

In a solid-state imaging apparatus using a CCD imaging device which is not formed with a shielded area 203 or 209 for obtaining an output corresponding to the optical black a method exists, by which the output corresponding to the dark current component is obtained. This dark current uses an idle transfer of the horizontal transfer register, after the charges corresponding to the final picture element in a horizontal scanning period are transferred through the horizontal register. The output from the horizontal register is used as the reference signal of the video signal.

The control method, according to the present invention, can also be applied by using the reference signal obtained from the horizontal register as if it were the signal obtained from the shielded imaging sensor 203 or 209 of FIG. 2. In other words, any type of the CCD imaging devices may be used with the present invention.

In the foregoing embodiment, incidentally, the output 121 of the gate circuit 120 is fed to the control circuit 117 so that the control signal 118 may be generated.

The present invention should not be limited to that method. This invention can be modified to produce similar results in other control circuits in a manner to directly control the iris 103 in accordance with the output 121.

As has been described in detail hereinbefore, according to the present invention, the output signal is extracted from the area for supplying the optical black to generate the control signal for the automatic iris control mechanism, thereby preventing the malfunction of the automatic iris control mechanism.

Although the foregoing description is directed wholly to a monochromatic solid-state imaging apparatus having a single CCD imaging device, the present invention should not be limited since it can also be applied to the chromatic and monochromatic imaging apparatus using a plurality of CCD imaging devices using single, twin, triple or more CCD chips so that the automatic iris control mechanism can be prevented from its malfunction with the use of the similar construction.

What is claimed is:

1. A solid-state imaging apparatus comprising: charge-coupled imaging means including an imaging area for generating charges responsive to light incident thereon, output means responsive to the charges generated in the imaging areas for producing an electrical output signal; first means for obtaining a video information signal from said electrical output signal; second means for obtaining a reference signal from said electrical output signal; optical iris means for controlling the intensity of light incident upon at least a part of said imaging area; first iris control means responsive to said video information signal for controlling said optical iris means and to said reference signal; overflow detection means for detecting an overflow of charges from said imaging area; and second iris control means responsive to the output of said overflow detection means for controlling said optical iris to lower said intensity of the light; whereby, when there is not an overflow of charges from said imaging area, said optical iris is controlled by said first iris control means to maintain said intensity of the light to a proper value, and, when there is an overflow of charges from said imaging area, said optical iris is controlled by said second iris control means to lower the intensity of light and thereby prevent said overflow of charges.

2. The apparatus claimed in claim 1, wherein said imaging area comprises a light receiving area for producing charges corresponding to the intensity of said light incident thereon and a shielded area for accumulating charges corresponding to an optical black signal, said first means obtaining said video information signal in response to charges produced in said light receiving area, and said second means obtaining said reference signal in response to charges accumulated in said shielded area.

3. The apparatus of claim 1, wherein said imaging device further includes transfer register means disposed between said imaging area and said output means for transferring charges from said imaging area to said output means, and said second means obtaining said reference signal responsive to an idle transfer within said transfer register means after charges corresponding to a last picture element in one horizontal period is transfered through said transfer register means to said output means.

4. A solid-state imaging apparatus comprising: a solid-state imaging means for generating a first signal relating to picture element information at a level corresponding to the quantity of incident light on said imaging means and for generating a second signal relating to reference information, said second signal having a level which is independent of the incident light; optical system means for forming an image upon a surface of said solid-state imaging means; optical iris means for controlling the quantity of the light incident upon said surface of said solid-state imaging means; means for extracting a video signal from the output of said solid-state imaging means in accordance with said picture element information; normal control means for controlling said optical iris means in accordance with said first signal; and alternate control means for controlling said optical iris means to lower the quantity of the incident light when said second signal is higher than a present level.

5. The apparatus of claim 4, wherein said solid-state imaging means includes a light receiving area having a plurality of photo-charge converting elements arranged two-dimensionally to generate said picture element information, and a non-light receiving area having a plurality of photo-charge converting elements optically shielded from said light for generating said reference information, said non-light receiving area being arranged to receive excess charges which overflowed from said light receiving area.

6. The apparatus of claim 4, wherein said solid-state imaging means includes a light receiving area, output means for converting the quantity of charges into an electric signal and transfer register means for transferring charges generated in said light receiving area to said output means, wherein said picture element information is obtained from said output means in accordance with charges generated in said light receiving area, and said reference information is obtained by an idle transfer, in said transfer register means after completion of a charge transfer of one horizontal period.

7. The apparatus of claim 4 or 5, further comprising a processing circuit means for forming a composite video signal which contains a synchronous signal from the output of said means for extracting the video signal.

8. An imaging apparatus comprising an integrated semiconductor matrix of individual light responsive imaging areas which produce free charge carriers in quantities corresponding to the intensity of light incident to the individual areas, means for causing at least one of said imaging areas to produce charges in a quantity irrespective of light incident to said one area, means for comparing the quantity of charges produced in the imaging area in the presence of light with the reference quantity of charges produced irrespective of light, and means responsive to said comparing means for reducing the intensity of said light falling on said area when said comparing means detect quantities which exceed a given difference.

9. The apparatus of claim 8 wherein said light intensity reducing means comprises an iris for passing light to said semiconductor matrix, control means responsive to charges produced in the presence of said light for normally controlling said iris, and said means responsive to said comparing means for overriding said normal control means and operating said iris to reduce the intensity of said light.

10. The apparatus of claim 8 wherein said integrated semiconductor matrix comprises areas surrounding said imaging areas for receiving any charges which overflow said imaging areas, the given difference being low enough so that said light intensity reducing means responds to said comparing means before said overflow occurs.

11. The apparatus of claim 10 wherein said matrix comprises rows and columns of said imaging areas and said integrated semiconductor comprises means for transferring said charges to means for generating video signals responsive thereto.

12. The apparatus of any one of the claims 8–11 and shielding means over said one imaging area for producing said reference quantity of charges signal.

13. The apparatus of claim 11 and means for detecting a signal level which occurs after the transfer of said quantities of charge carriers from a last imaging area in said matrix for producing and absence of light signal.

* * * * *

UNITED STATES PATENT AND TRADEMARK OFFICE
CERTIFICATE OF CORRECTION

PATENT NO. : 4,327,378
DATED : April 27, 1982
INVENTOR(S) : TANAKA, et al.

It is certified that error appears in the above-identified patent and that said Letters Patent is hereby corrected as shown below:

Column 1, line 49, insert a comma --,-- after "area".

Column 2, line 64, "votlage" should be --voltage--.

Signed and Sealed this

Twenty-fourth Day of August 1982

[SEAL]

Attest:

GERALD J. MOSSINGHOFF

Attesting Officer     Commissioner of Patents and Trademarks